(12) United States Patent
Fandrey et al.

(10) Patent No.: US 11,458,652 B2
(45) Date of Patent: Oct. 4, 2022

(54) DEVICE AND METHOD FOR MELTING A HOT-MELT ADHESIVE

(71) Applicant: KLEBCHEMIE M. G. BECKER GMBH & CO. KG, Weingarten/Baden (DE)

(72) Inventors: Jens Fandrey, Pforzheim (DE); René Schog, Elsdorf (DE)

(73) Assignee: KLEBCHEMIE M. G. BECKER GMBH & CO. KG, Weingarten/Baden (DE)

( * ) Notice: Subject to any disclaimer, the term of this patent is extended or adjusted under 35 U.S.C. 154(b) by 140 days.

(21) Appl. No.: 16/760,721

(22) PCT Filed: Nov. 29, 2018

(86) PCT No.: PCT/EP2018/082962
§ 371 (c)(1),
(2) Date: Apr. 30, 2020

(87) PCT Pub. No.: WO2019/106071
PCT Pub. Date: Jun. 6, 2019

(65) Prior Publication Data
US 2020/0316820 A1 Oct. 8, 2020

(30) Foreign Application Priority Data
Dec. 1, 2017 (DE) ...................... 10 2017 221 708.1

(51) Int. Cl.
*B29B 13/02* (2006.01)
*B05C 17/005* (2006.01)
(Continued)

(52) U.S. Cl.
CPC ...... *B29B 13/022* (2013.01); *B05C 17/00546* (2013.01); *B05C 11/1013* (2013.01);
(Continued)

(58) Field of Classification Search
CPC ............ B29B 13/022; B29K 105/0097; B05C 17/00546; B05C 11/1013; B05C 11/1042; B05C 17/00533; B32B 2037/1215
(Continued)

(56) References Cited

U.S. PATENT DOCUMENTS

| 3,325,510 A | 6/1967 | Rice et al. |
| 4,067,481 A | 1/1978 | Feldman |

(Continued)

FOREIGN PATENT DOCUMENTS

| AU | 6818990 A | 6/1991 |
| CN | 2123382 U | 12/1992 |

(Continued)

OTHER PUBLICATIONS

DE 3733029 with Machine Translation (Year: 1989).*
(Continued)

*Primary Examiner* — Vishal Pancholi
(74) *Attorney, Agent, or Firm* — Birch, Stewart, Kolasch & Birch, LLP (57) ABSTRACT

The invention relates to a device (1) for melting a hot-melt adhesive (3), comprising a heating plate (5), a plunger (7), the plunger (7) comprising a plunger end face (9), and a mounting (11), wherein the mounting (11) is suitable for receiving a storage container (13), which has a rigid lateral wall (15) and two opposite side faces (17, 19) and contains the hot-melt adhesive (3), in such a manner that the hot-melt adhesive (3) is arranged between the plunger (7) and the to heating plate (5), and the plunger end face (9) and the heating plate (5) are arranged opposite one another, wherein the heating plate (5), the plunger (7) and the mounting (11) are so dimensioned that the storage container (13) having an (Continued)

inner volume (21) of more than 50 L can be received. The invention relates further to a method for melting a hot-melt adhesive.

15 Claims, 5 Drawing Sheets (51) Int. Cl.
B05C 11/10 (2006.01)
B29K 105/00 (2006.01)
B32B 37/12 (2006.01)

(52) U.S. Cl.
CPC ... B05C 11/1042 (2013.01); B29K 2105/0097 (2013.01); B32B 2037/1215 (2013.01)

(58) Field of Classification Search
USPC .................................................. 222/146.5
See application file for complete search history.

(56) References Cited

U.S. PATENT DOCUMENTS

| | | | |
|---|---|---|---|
| 4,195,755 A * | 4/1980 | Slautterback | B29B 13/022 219/230 |
| 4,714,514 A | 12/1987 | Hoopengardner | |
| 5,318,198 A | 6/1994 | Micek et al. | |
| 6,527,143 B1 | 3/2003 | Schomäcker | |
| 7,015,427 B1 | 3/2006 | Jeter | |
| 7,544,385 B2 | 6/2009 | Hansel et al. | |
| 7,939,137 B2 | 5/2011 | Becker-Weimann et al. | |
| 7,997,314 B2 | 8/2011 | Becker-Weimann et al. | |
| 8,153,264 B2 | 4/2012 | Ehrmann et al. | |
| 8,653,219 B2 | 2/2014 | Becker-Weimann et al. | |
| 9,399,721 B2 | 7/2016 | Fandrey et al. | |
| 9,518,187 B2 | 12/2016 | Becker-Weimann et al. | |
| 2001/0009752 A1 | 7/2001 | Reifenberger et al. | |
| 2002/0130143 A1 | 9/2002 | Schouten et al. | |
| 2007/0007305 A1 | 1/2007 | Becker-Weimann | |
| 2007/0029040 A1 | 2/2007 | Struve | |
| 2007/0267141 A1 | 11/2007 | Ehrmann et al. | |
| 2009/0236360 A1 | 9/2009 | Gefri et al. | |
| 2010/0308079 A1 | 12/2010 | Rothen | |
| 2011/0087367 A1 | 4/2011 | Gadini et al. | |
| 2011/0129651 A1 | 6/2011 | Becker-Weimann et al. | |
| 2013/0112280 A1 | 5/2013 | Quam et al. | |
| 2013/0112709 A1 | 5/2013 | Ross et al. | |
| 2013/0338291 A1 | 12/2013 | Becker-Weimann et al. | |
| 2016/0338209 A1 | 11/2016 | Senga et al. | |
| 2018/0353992 A1 | 12/2018 | Becker-Weimann et al. | |

FOREIGN PATENT DOCUMENTS

| | | |
|---|---|---|
| CN | 2575592 Y | 9/2003 |
| CN | 1492825 A | 4/2004 |
| CN | 1775377 A | 5/2006 |
| CN | 201543577 U | 8/2010 |
| CN | 101925413 A | 12/2010 |
| CN | 102625868 A | 8/2012 |
| CN | 202762605 U | 3/2013 |
| CN | 202828846 U | 3/2013 |
| CN | 203511993 U | 4/2014 |
| CN | 203650737 U | 6/2014 |
| CN | 104023855 A | 9/2014 |
| CN | 104061674 A | 9/2014 |
| CN | 203820872 U | 9/2014 |
| CN | 105032303 A | 11/2015 |
| CN | 105873709 A | 8/2016 |
| CN | 205939314 U | 2/2017 |
| CN | 107188344 A | 9/2017 |
| DE | 29 25 088 A1 | 1/1980 |
| DE | 37 33 029 C1 | 2/1989 |
| DE | 103 41 256 A1 | 7/2004 |
| DE | 10 2006 009 113 A1 | 8/2007 |
| DE | 20 2009 014 470 U1 | 1/2010 |
| EP | 0 102 804 A2 | 3/1984 |
| EP | 0 330 390 A1 | 8/1989 |
| EP | 0 434 617 A1 | 6/1991 |
| EP | 0 565 752 A1 | 10/1993 |
| EP | 1 889 794 A1 | 2/2008 |
| EP | 2 298 669 A1 | 3/2011 |
| EP | 2 942 108 A | 11/2015 |
| FR | 1376026 A | 9/1964 |
| GB | 2 162 585 A | 2/1986 |
| JP | 8-1833 A | 1/1996 |
| JP | 2015-116684 A | 6/2015 |
| RU | 2 368 634 C2 | 9/2009 |
| TW | 201341295 A | 10/2013 |
| WO | WO 00/53338 A2 | 9/2000 |
| WO | WO 02/094457 A2 | 11/2002 |
| WO | WO 02/094549 A2 | 11/2002 |
| WO | WO 2004/099333 A1 | 11/2004 |
| WO | WO 2006/056472 A1 | 6/2006 |
| WO | WO 2006/058739 A1 | 6/2006 |
| WO | WO 2006/066954 A1 | 6/2006 |
| WO | WO 2006/106143 A1 | 10/2006 |
| WO | WO 2007/107531 A1 | 9/2007 |
| WO | WO 2010/003959 A2 | 1/2010 |
| WO | WO 2012/084805 A1 | 6/2012 |
| WO | WO 2012/084823 A1 | 6/2012 |
| WO | WO 2015/083271 A1 | 6/2015 |
| WO | WO 2015/171341 A1 | 11/2015 |
| WO | WO 2016/174021 A1 | 11/2016 |

OTHER PUBLICATIONS

International Preliminary Report on Patentability, issed in PCT/EP2018/082962, dated Mar. 6, 2020.
International Search Report, issued in PCT/EP2018/082962, dated Feb. 13, 2019.
Written Opinion of the International Searching Authority, issed in PCT/EP2018/082962, dated Feb. 13, 2019.
Chinese Office Action for Chinese Application No. 201880077530. 2, dated Aug. 17, 2021, with an English translation.

* cited by examiner

DEVICE AND METHOD FOR MELTING A HOT-MELT ADHESIVE

The invention relates to a device for melting a hot-melt adhesive, comprising a heating plate and a plunger. The invention relates further to a method for melting a hot-melt adhesive, comprising providing the hot-melt adhesive in a storage container and pressing the hot-melt adhesive against a heating plate.

Devices for melting hot-melt adhesives, which are also referred to as pre-melters, serve to warm hot-melt adhesives, which can be applied in melted form, for example, to surfaces.

Known pre-melters are, for example, drum melters and bag melters, which can comprise a pump.

In the case of drum melters, a heating plate with fins is immersed into the drum. A disadvantage is that relatively large residual amounts remain in the drum and cannot be used.

Also known as a device for melting is the hot-melt adhesive device Topmelter 2518 from the manufacturer Klebchemie M.G. Becker GmbH & Co. KG. The Topmelter 2518, which is a bag melter without a pump, serves to melt and feed inter alia reactive, crosslinking polyurethane hot-melt adhesives. The hot-melt adhesive is supplied in an aluminum composite bag which contains a mass of from 18 kg to 20 kg of hot-melt adhesive. The aluminum composite bag is first removed from a sleeve, opened and positioned in a tank, which is a permanent component of the Topmelter 2518, so that the hot-melt adhesive is arranged on a heating plate. The Topmelter 2518 further has a cylinder, which is arranged above the tank containing the aluminum composite bag, moves downwards and presses on the aluminum composite bag and thus on the hot-melt adhesive that is to be melted. Accordingly, the heating plate, the hot-melt adhesive and the cylinder are arranged vertically one above the other. In the tank, the hot-melt adhesive is melted and pressed by the cylinder to a distribution system. The tank can accommodate a mass of not more than 25 kg, and from 18 kg to 20 kg per hour of hot-melt adhesive are fed at an operating pressure of the cylinder of 6 bar and an adhesive temperature of between 120° C. and 150° C.

EP 0 565 752 A1 describes a method for coating sheet-form carrier material and a coating system for carrying out the method having an application unit, whereby no details concerning the pre-melter are disclosed.

The devices and the method according to the prior art have the disadvantage that, owing to the limited size of the drums of hot-melt adhesive that can be handled, the amount of melted hot-melt adhesive fed per unit time is limited, or relatively large residual amounts of hot-melt adhesive remain in the storage containers.

It is an object of the present invention to provide a device and a method which allow the fed amount to be increased and also safe handling of larger drums of hot-melt adhesive. Furthermore, a residual amount remaining in the container is to be reduced with the present invention.

The object is achieved by a device for melting a hot-melt adhesive, comprising a heating plate, a plunger, the plunger comprising a plunger end face, and a mounting, wherein the mounting is suitable for receiving a storage container, which has a rigid lateral wall and two opposite side faces and contains the hot-melt adhesive, in such a manner that the hot-melt adhesive is arranged between the plunger and the heating plate, and the plunger end face and the heating plate are arranged opposite one another, wherein the heating plate, the plunger and the mounting are so dimensioned that the storage container having an inner volume of more than 50 L can be received.

The object is further achieved by a device for melting a hot-melt adhesive, comprising a heating plate, a plunger, the plunger comprising a plunger end face, a mounting and a storage container having an inner volume of more than 50 L, wherein the storage container has a rigid lateral wall and two opposite side faces and contains the hot-melt adhesive, the plunger end face and the heating plate are arranged opposite one another, and the storage container is received in the mounting in such a manner that the hot-melt adhesive is arranged between the plunger and the heating plate.

The object is additionally achieved by a method for melting a hot-melt adhesive, comprising the following steps:
a. providing the hot-melt adhesive in a storage container having an inner volume of more than 50 L, wherein the storage container has a rigid lateral wall and two opposite side faces,
b. arranging the storage container, containing the hot-melt adhesive in unmelted form, in a device for melting, in particular in a device for melting according to the invention, comprising a heating plate, so that a first of the two opposite side faces is arranged at the heating plate,
c. feeding the hot-melt adhesive relative to the storage container and in the direction towards the heating plate, wherein the two opposite side faces of the storage container are open, so that the hot-melt adhesive is brought into contact with the heating plate and there is formed melted hot-melt adhesive, which flows away on the heating plate, wherein the device for melting has a plunger, the plunger comprising a plunger end face, and the hot-melt adhesive is pressed against the heating plate with a pressing pressure by means of the plunger, and the pressing pressure is preferably more than 6 bar.

The device according to the invention and the method according to the invention serve for processing large drums of hot-melt adhesive comprising more than 50 L. To that end, the hot-melt adhesive is melted directly in the storage container in which the hot-melt adhesive is usually delivered and can be fed to further processing, such as application to surfaces. The hot-melt adhesive does not have to be removed from the storage container after delivery and prior to melting, which facilitates handling of large drums.

The hot-melt adhesive (also referred to as hot-melt composition) is preferably a commercially available reactive hot-melt composition, in particular based on polyurethane, which preferably reacts and cures by moisture, for example from the surrounding air. Preferably, the hot-melt adhesive is water- and solvent-free, which in the meantime can be used within the scope of "HotCoating" technology for the finishing of surfaces. Consequently, the hot-melt adhesive can be used for bonding and also for surface coating. Examples of compositions and applications are described in WO-A 2004/099333, WO-A 02/094549, WO-A 02/094457, WO-A 2006/056472, WO-A 2006/058739, WO-A 2006/066954, WO-A 2006/106143, WO-A 2007/107531, WO-A 2010/003959, WO-A 2012/084823, WO-A 2012/084805, WO-A 2016/174021.

The hot-melt adhesive is a product which is solid at room temperature and liquid when hot. The temperature at which the hot-melt adhesive is applied is typically in a range of from 60° C. to 150° C., preferably from 100° C. to 140° C., wherein the hot-melt adhesive preferably has a viscosity according to BROOKFIELD at 120° C. in the range of from 1000 mPas to 30,000 mPas, more preferably from 4000 mPas to 10,000 mPas. The density of the hot-melt adhesive is usually 1.1 g/m². Depending on the application unit, the layer of hot-melt adhesive can be applied, for example, by doctor blade, by roller, by spraying or by means of dies or slot dies, or by means of curtain coating or by fiberization (thread application). Approximately from 20 g to 1200 g, preferably from 20 g to 450 g, further preferably from 20 g to 300 g, of hot-melt adhesive can thereby be applied per square meter. Advantageously, the hot-melt adhesive has a certain residual elasticity, even in the cured state. Curing, in addition to physical solidification, preferably takes place at least in part—in particular solely—by moisture curing with the aid of atmospheric moisture.

In order to achieve resistances which may be required, the hot-melt adhesive can comprise additives, auxiliary substances and/or fillers, wherein particles of a filler component can be varied within a wide range in respect of material, particle size, particle shape and particle weight. By thoroughly incorporating the particles of the filler component into the hot-melt adhesive with high viscosity and specific rheology, the particles remain largely evenly distributed, even at a relatively high processing temperature, so that no additional mixing is necessary.

The filler component can be, for example, a metal oxide, silicon dioxide, metal carbide, silicon carbide, metal nitride, silicon nitride or boron nitride. Suitable materials are corundum, emery, a spinel and/or zirconium oxide.

The amount of filler component is preferably in the range of from 5% by weight to 60% by weight, based on the total weight of the hot-melt adhesive. Further preferably, the amount is in the range of from 10% by weight to 50% by weight, yet more preferably in the range of from 15% by weight to 30% by weight.

The melting according to the invention of the hot-melt adhesive is to be assigned to the ablation principle, wherein the hot-melt adhesive in unmelted form is pressed against the heating plate so that the hot-melt adhesive melts. The device for melting according to the invention can also be referred to as a pre-melter.

The heating plate, which can also be referred to as a heatable melting wall, is understood as being a flat element, preferably made of metal, in particular of aluminum, copper or brass, which has a plate temperature which is greater than ambient temperature. The plate temperature is in particular more than 80° C., preferably more than 100° C. and more preferably more than 130° C. Furthermore, the plate temperature is usually less than 250° C., preferably less than 200° C. Preferably, the plate temperature is from 130° C. to 200° C., more preferably from 145° C. to 185° C.

In step c), the hot-melt adhesive is preferably warmed at the heating plate to an adhesive temperature of more than 70° C., more preferably to an adhesive temperature of more than 90° C. and in particular to an adhesive temperature of between 100° C. and 130° C. In particular, the melted hot-melt adhesive has the adhesive temperature on leaving the device for melting.

Preferably, the heating plate has a V-shaped surface structure, in particular on a surface that faces the hot-melt adhesive, wherein the V-shaped surface structure forms an outlet for melted hot-melt adhesive. Advantageously, the heating plate has grooves, which preferably form the V-shaped surface structure. The grooves are preferably arranged in two groups in each case in parallel lines, wherein the lines of the two groups more preferably meet at an axis of reflection of the heating plate, whereby the V-shaped surface structure is formed. Preferably, channels are present between the parallel lines of the grooves. Furthermore, the grooves have a width and/or depth in a range of from 2 mm to 15 mm, in particular from 3 mm to 7 mm, for example 5 mm. The channels advantageously have a width and/or depth in a range of from 2 mm to 15 mm, in particular from 10 mm to 15 mm, for example 12 mm. The melted hot-melt adhesive can flow into the channels and along the grooves to the bottom of the V-shaped structure. Two lines that meet, one from each of the two groups, preferably enclose an angle γ of from 30° to 70°.

Preferably, the plunger end face and the heating plate enclose an angle α of more than 30°, more preferably of more than 45°, particularly preferably of more than 60°, especially preferably of more than 80°, for example of 90°, with a horizontal plane. Both the plunger end face and the heating plate, in particular the surface of the heating plate that faces the hot-melt adhesive, are preferably arranged substantially vertically, wherein the plunger end face and the heating plate can also be inclined relative to the horizontal plane, but preferably are not arranged horizontally.

Advantageously, the orientation of the plunger end face and of the heating plate corresponds to the orientation of the two opposite side faces of the storage container.

The plunger can also be referred to as a piston, wherein in the device for melting, the plunger end face is preferably directed towards the hot-melt adhesive and may be in contact with the hot-melt adhesive. The plunger can constitute a solid cylinder or be composed of at least two cylindrical elements which have different diameters. Furthermore, the plunger is preferably movably arranged on the device for melting and particularly preferably movably arranged in the storage container arranged in the device for melting, so that the hot-melt adhesive can be pressed by the plunger out of the storage container, or in the direction towards the heating plate. Particularly preferably, the plunger is a displaceably mounted, power-operated delivery piston.

The mounting for receiving the storage container is preferably immovably fastened to the device for melting, so that the storage container can be placed on the mounting and can be brought by the mounting into an optionally fixed position. Preferably, the mounting comprises at least one half-shell, in which the storage container is arranged. The at least one half-shell is advantageously made of metal. Spacings of more than one half-shell, which are preferably arranged in parallel, are preferably adapted to conventional cranes and/or forklift trucks.

Storage container denotes a container in which the hot-melt adhesive is stored, transported and/or delivered, and which in particular is not a permanent component of the device for melting. The storage container can also be referred to as a drum. The storage container can be arranged in the device with open two opposite side faces, or the two opposite side faces can be opened in the device, so that preferably the first of the two opposite side faces is arranged open at the heating plate and a second of the two opposite side faces is arranged open at the plunger end face. The plunger enters through the second of the two opposite side faces preferably into the storage container and exerts the pressing pressure on the hot-melt adhesive. The pressing pressure can vary according to the application and can be applied in a wide range. For example, the pressing pressure can be 6 bar or more. Elevated pressing pressures, such as, for example, more than 7 bar, more than 8 bar, but usually less than 15 bar, are also advantageous for increasing the melting performance. For example, the pressing pressure is then from 8.5 bar to 9.5 bar, such as, for example, 9 bar. As the hot-melt adhesive melts, the portion of the hot-melt adhesive remaining in the unmelted state is moved by the plunger in the storage container towards the heating plate and likewise melted. The melted hot-melt adhesive flows away on the heating plate and out of the storage container and can be fed to subsequent further processing.

The storage container has the rigid lateral wall along a lateral face of the storage container, wherein rigid is to be understood as meaning that the lateral wall is in itself dimensionally stable, in particular also when the storage container is arranged upright in the empty state. The inner volume of the storage container is preferably delimited by the rigid lateral wall and the two opposite side faces.

The inner volume of the storage container is preferably more than 80 L, more preferably more than 150 L and particularly preferably from 180 L to 220 L, for example 200 L. The inner volume of the storage container is usually not more than 300 L.

In step c) of the method according to the invention, preferably more than 50 kg of the hot-melt adhesive are melted per hour, more preferably more than 80 kg per hour and particularly preferably from 100 kg to 160 kg per hour.

Preferably, the storage container has a cylindrical shape which is delimited by the rigid lateral wall and the two opposite side faces.

The storage container can further comprise two opposite side walls, which are removed at the latest before step c), so that the two opposite side faces of the storage container are open. The two opposite side walls of the storage container can be lids which are removed before the plunger presses the hot-melt adhesive through the storage container onto the heating plate.

The rigid lateral wall and/or the two opposite side walls of the storage container are advantageously made of steel, plastics material or wood fibers.

In step b) of the method according to the invention, the rigid lateral wall of the storage container is preferably arranged tightly against the heating plate at the first of the two opposite side faces. The heating plate preferably has a seal, which can also be referred to as a stop. In particular, the seal represented an outer edge of the heating plate. More preferably, in step b) of the method according to the invention, the rigid lateral wall of the storage container is arranged tightly against the seal and in particular pressed against the seal at the first of the two opposite side faces. To that end, the device can have at least one further plunger which presses the rigid lateral wall of the storage container against the heating plate. The storage container is preferably brought into the fixed position by the at least one further plunger. Alternatively, a different sealing connection, such as a screw connection or clamping, for example by means of a toggle lever, is also conceivable. The direction of movement of the at least one further plunger preferably corresponds to the direction of movement of the plunger that presses the hot-melt adhesive.

The device for melting can further have a pipe socket to which an extraction system for removing process gases can be connected. The pipe socket is preferably arranged above the heating plate.

The storage container preferably has a longitudinal axis which intersects the two opposite side faces, and in step b), preferably the storage container, more preferably the device for melting together with the storage container, is so arranged in the device for melting that the longitudinal axis of the storage container encloses an angle β of less than 80° with a horizontal plane. More preferably, the angle β is from 0° to 45°, particularly preferably from 5° to 30°. In a preferred embodiment, the angle β is 0°. Correspondingly, the storage container is preferably arranged substantially horizontally.

It is advantageous if the angle β is more than 0°, since residual amounts of hot-melt adhesive are able to run along the rigid lateral wall owing to the inclination.

Further preferably, a flexible sleeve, which can also be referred to as a liner, is arranged in the storage container, in which flexible sleeve the hot-melt adhesive is particularly preferably received. Contamination of the storage container and/or of the plunger with hot-melt adhesive, in particular with melted hot-melt adhesive, is avoided by means of the flexible sleeve. Likewise, a backflow of hot-melt adhesive, in particular of melted hot-melt adhesive, during the method is prevented by the flexible sleeve. When the storage container is arranged in the device for melting, the flexible sleeve has an opening at least on one side of the flexible sleeve, so that the hot-melt adhesive can be brought into contact with the heating plate and can be removed from the flexible sleeve and also from the storage container. Preferably, the side of the flexible sleeve is arranged on the first of the two opposite side faces of the storage container, which is arranged at the heating plate.

Preferably, the flexible sleeve is arranged between the plunger end face and the hot-melt adhesive, so that the plunger end face is not in direct contact with the hot-melt adhesive. During feeding of the hot-melt adhesive in the direction towards the heating plate, the flexible sleeve is preferably folded by the movement of the plunger.

The flexible sleeve further preferably has a sleeve material which comprises aluminum, particularly preferably the flexible sleeve is an aluminum composite bag.

In particular, the flexible sleeve can be in the form of a round-bottomed bag, wherein the sleeve material advantageously comprises a composite film comprising a metal ply of a light-metal film, in particular an aluminum film. The composite film can further comprise a plastics ply of polypropylene or polyethylene terephthalate as an inner layer, and the composite film preferably has an overall thickness of from 0.05 to 0.15 mm.

Preferably, the hot-melt adhesive is arranged in the storage container in the flexible sleeve, and the flexible sleeve is opened before step b) at least at the first of the two opposite side faces, wherein during opening preferably a portion of the flexible sleeve is folded back against the rigid lateral wall.

There is further proposed a coating device which comprises an application unit and a device for melting according to the invention.

Preferably, the device for melting is arranged on the application unit, and the melted adhesive flows into the application unit by means of gravity and by the pressing pressure, or the device for melting has a pump, and the melted hot-melt adhesive is fed to the application unit by means of the pump, wherein the application unit preferably comprises a hose and a slot die. The hose is preferably heatable.

In the case in which the device for melting is arranged on the application unit, the application unit is preferably a roller application system. The roller application system preferably comprises application rollers and/or smoothing rollers. Neither a pump nor a hose is required here, whereby wear of pumps and a source of disruption by, for example, blocking of the hose are avoided.

BRIEF DESCRIPTION OF THE DRAWINGS

Embodiments according to the invention are shown in the drawings and will be explained in greater detail in the following description.

In the drawings.

Figure 1:
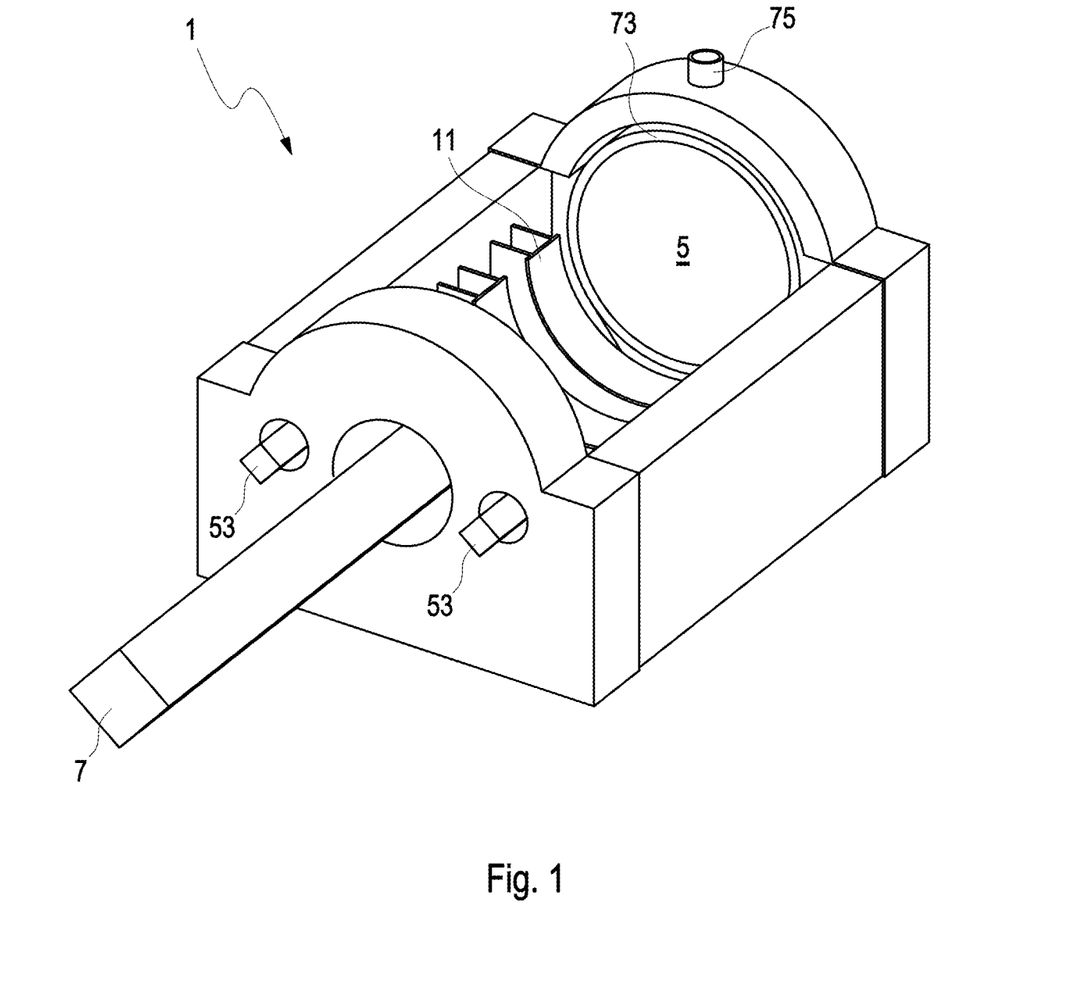
FIG. 1 shows a device according to the invention for melting a hot-melt adhesive.

FIG. 1 shows a device 1 for melting according to the invention, comprising a heating plate 5 having a seal 73, a plunger 7 and a mounting 11. In addition to the plunger 7, two further plungeres 53 are provided. The heating plate 5 and the plunger 7 are arranged spaced apart from and opposite one another, wherein the mounting 11 is located at least in part between the heating plate 5 and the plunger 7. Above the heating plate 5, the device 1 for melting has a pipe socket 75 to which an extraction system can be connected.

Figure 2:
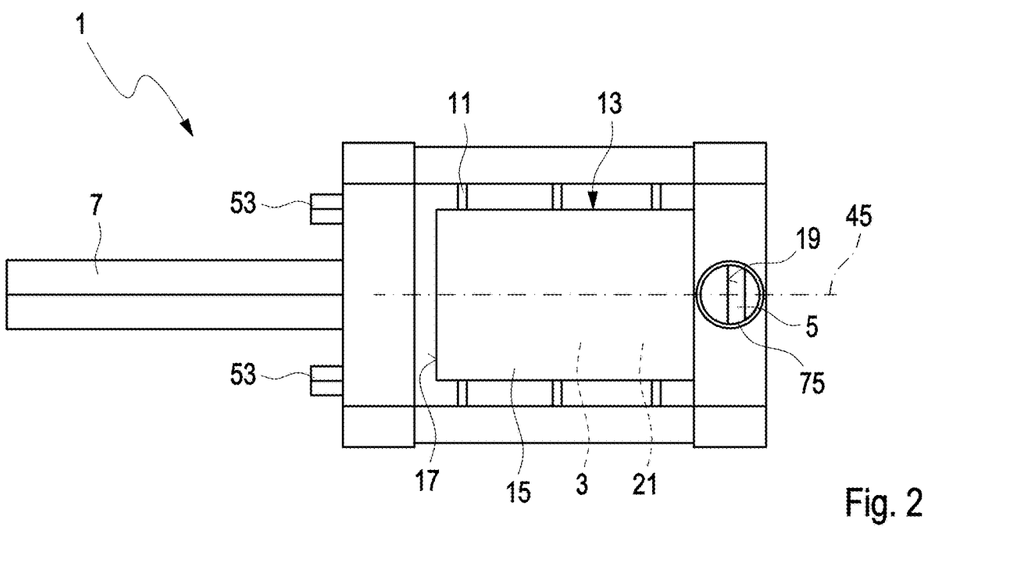
FIG. 2 is a plan view of a device according to the invention for melting a hot-melt adhesive.

FIG. 2 is a plan view of a device 1 according to the invention for melting a hot-melt adhesive 3. The device 1 for melting comprises a heating plate 5, a plunger 7, a mounting 11 and a storage container 13. A pipe socket 75 is further arranged above the heating plate 5. The storage container 13 has an inner volume 21, which is delimited by a rigid lateral wall 15 and two opposite side faces 17, 19. The storage container 13 further has a longitudinal axis 45, which intersects a first of the two opposite side faces 19 and a second of the two opposite side faces 17. In this representation, only a portion of each of the heating plate 5 and the first of the two side faces 19 is visible through the pipe socket 75.

The storage container 13 contains the hot-melt adhesive 3 and is received in the mounting 11. The mounting 11 holds the storage container 13, in particular the rigid lateral wall 15, in a fixed position. The fixed position of the rigid lateral wall 15 can be supported by further plungeres 53. Furthermore, the storage container 13 is arranged in the mounting 11 at least in part between the plunger 7 and the heating plate 5.

Figure 3:
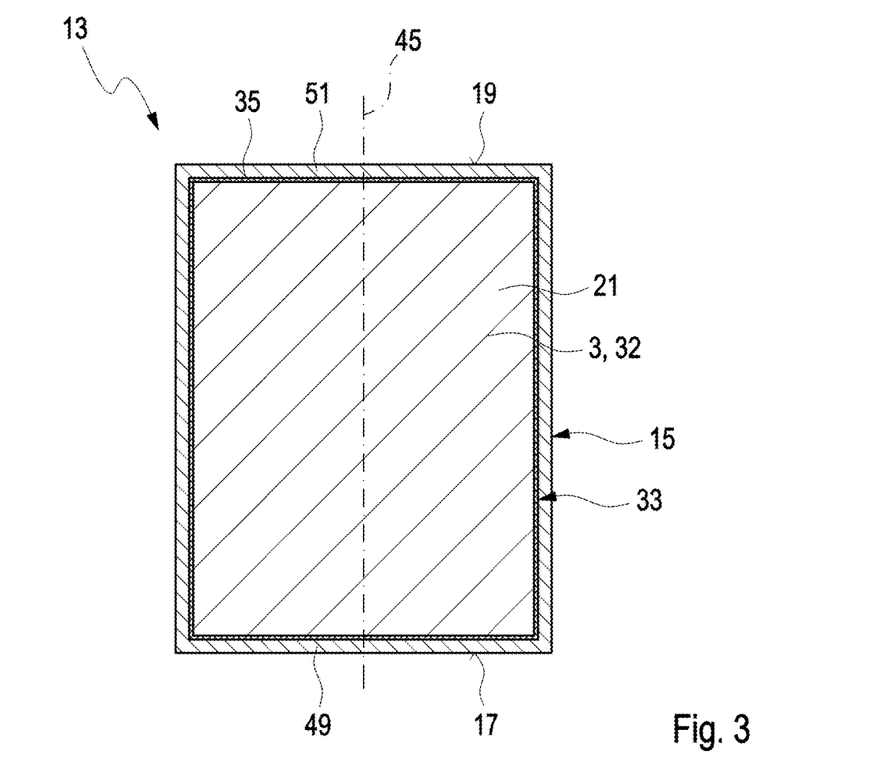
FIG. 3 shows a storage container.

FIG. 3 shows a storage container 13 which is arranged in a device 1 for melting according to the invention. The storage container 13 has an inner volume 21, which is delimited by a rigid lateral wall 15 and two opposite side faces 17, 19. There are initially located at the two opposite side faces 17, 19 two opposite side walls 49, 51, which are removed for carrying out the method according to the invention, so that the two opposite side faces 17, 19 are open.

The hot-melt adhesive 3 in unmelted form 32 is arranged in the inner volume 21 of the storage container 13. In the embodiment shown here, the hot-melt adhesive 7 is surrounded in the storage container 13 by a flexible sleeve 33. The storage container 13, which here is cylindrical in shape, further has a longitudinal axis 45, which is parallel to the rigid lateral wall 15 and intersects the two opposite side faces 17, 19 orthogonally.

Figure 4:
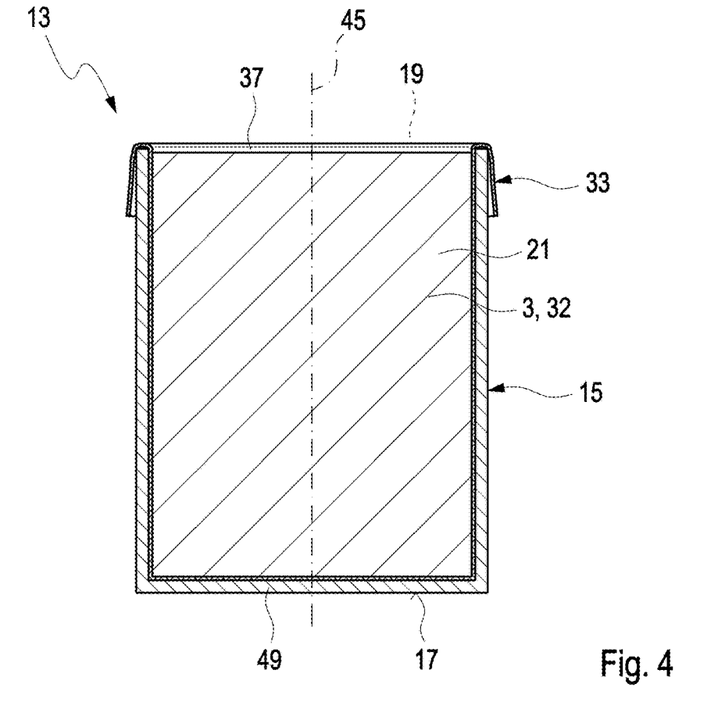
FIG. 4 shows an open storage container.

FIG. 4 shows an open storage container 13, which differs from the storage container 13 according to FIG. 3 in that the side wall 51 has already been removed at the first of the first of the two opposite side faces 19. Furthermore, the flexible sleeve 33 has been opened on one side 35 of the flexible sleeve 33, so that an opening 37 has been formed. A portion of the flexible sleeve 33, which had closed the opening 37, has been folded outwards about the rigid lateral wall 15, so that the hot-melt adhesive 3 at the first of the two opposite side faces 19 of the storage container 13 is exposed.

Figure 5:
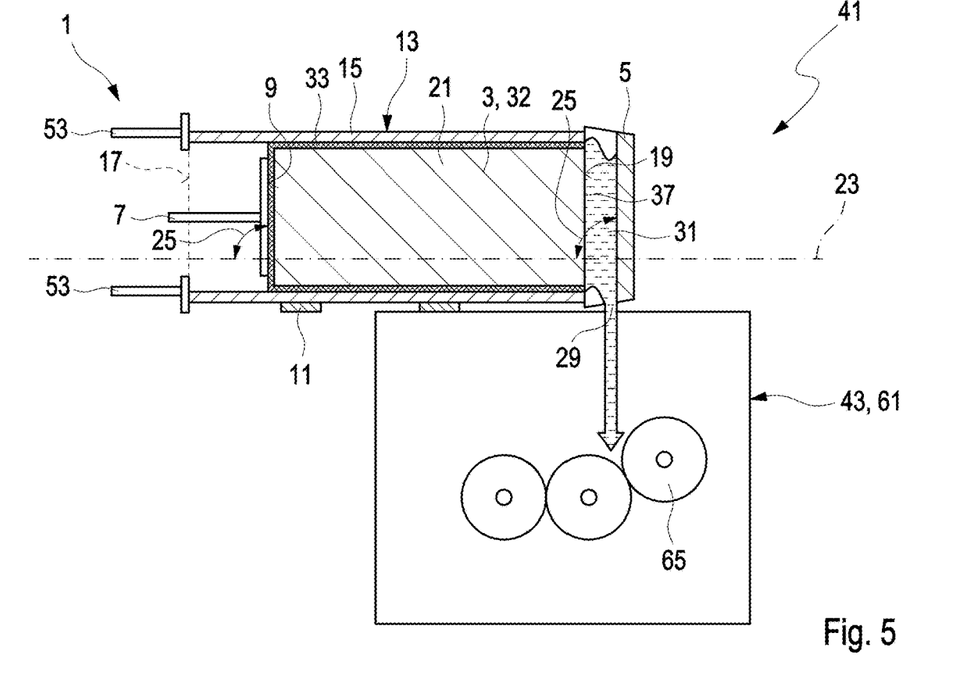
FIG. 5 shows a coating device comprising a device for melting according to the invention.

FIG. 5 shows a coating device 41 comprising an application unit 43 and a device 1 for melting according to the invention. As the application unit 43 there is shown a first application unit 61, which comprises rollers 65.

The device 1 for melting is so arranged that the plunger end face 9 of the plunger 7 and also the heating plate 5 enclose an angle α 25 of 90° with a horizontal plane 23. Correspondingly, the storage container 13 is arranged with the rigid lateral wall 15 horizontal.

The hot-melt adhesive 3 in unmelted form 32 is melted at the heating plate 5, so that melted adhesive 31 is present, which melted adhesive 31 flows from above through an outlet 29 directly into the application unit 43 by means of gravity and as a result of the pressing pressure.

Figure 6:
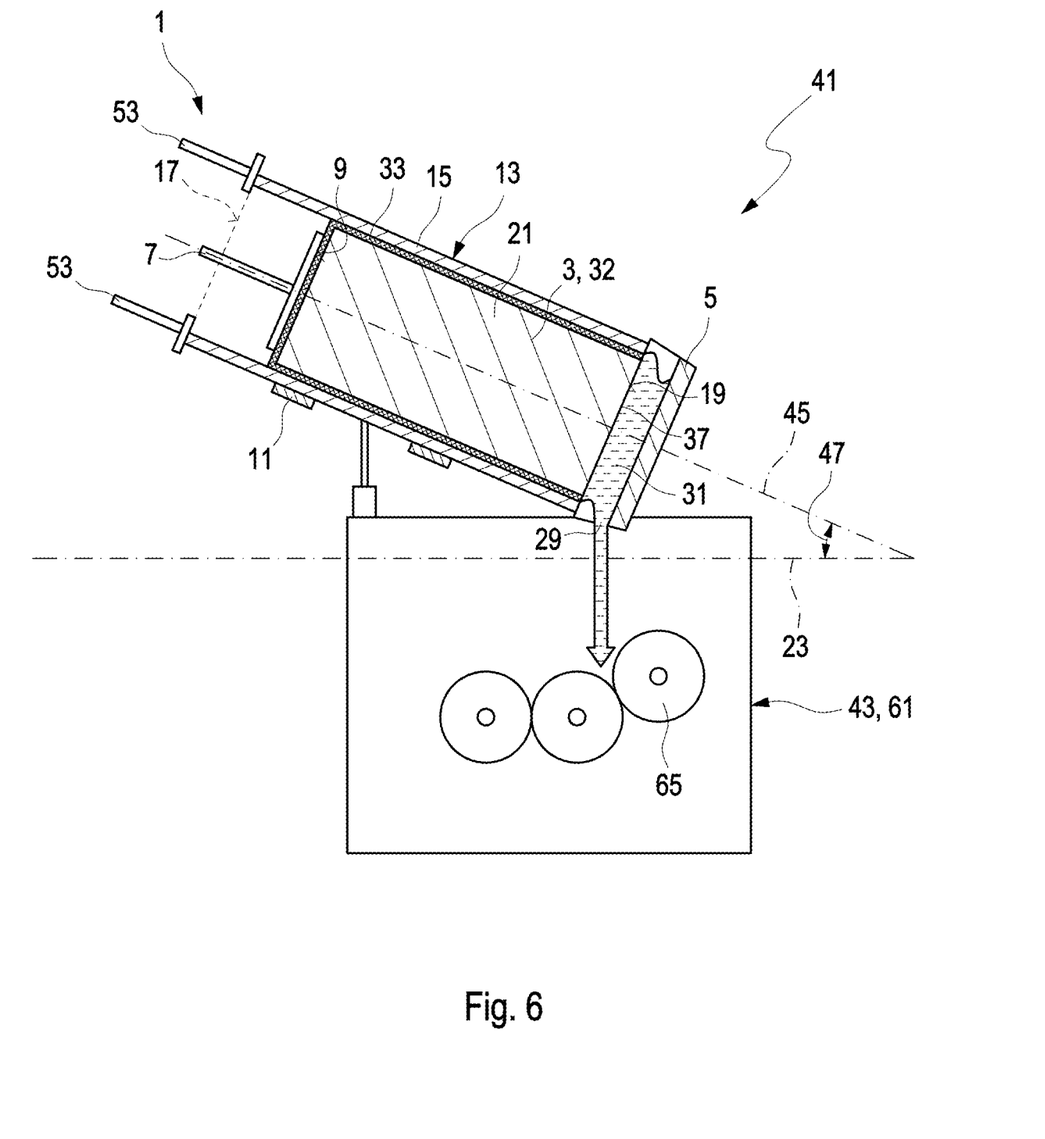
FIG. 6 shows a coating device comprising a further embodiment of a device for melting according to the invention.

FIG. 6 shows a coating unit 41 which corresponds substantially to the coating unit 41 according to FIG. 5, with the difference that the storage container 13 in the device 1 according to the invention is here arranged on the application device 43 inclined by an angle β 47. The angle β 47 is enclosed by a horizontal plane 23 and the longitudinal axis 45 of the storage container 13 and in the embodiment shown is less than 45°.

Figure 7:
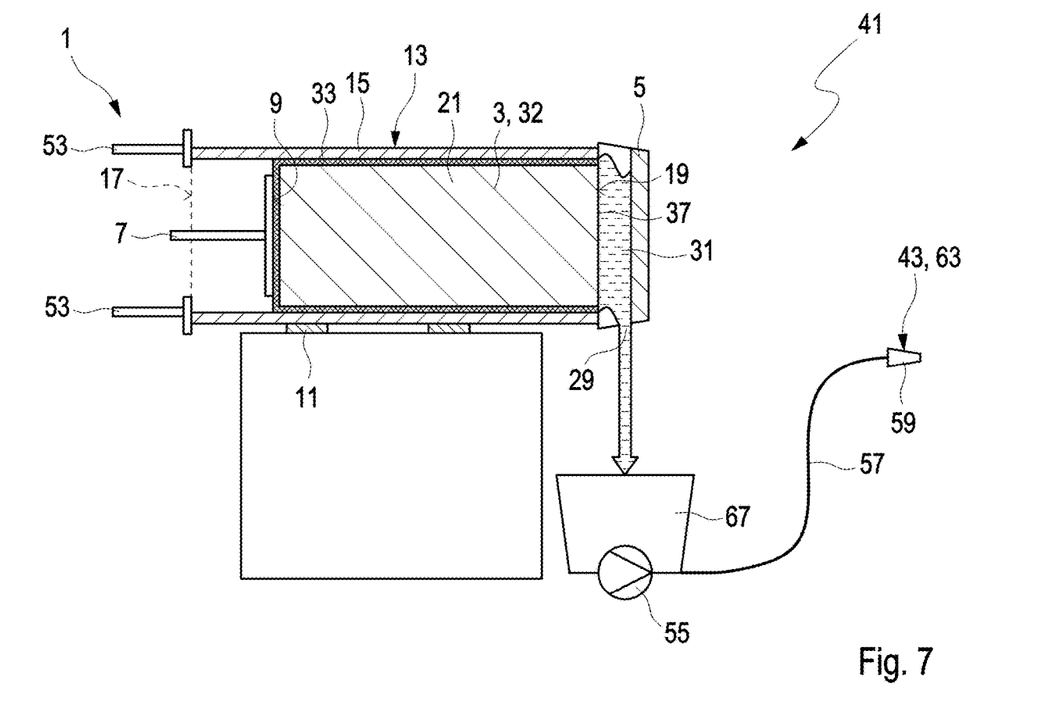
FIG. 7 shows a coating device comprising a device for melting according to the invention and a further embodiment of an application unit.

FIG. 7 shows a coating device 41 having a device 1 for melting according to the invention and an application unit 43. As the application unit 43 is a second application unit 63, which comprises a hose 57, which is heatable, and a slot die 59.

In this embodiment, the device 1 for melting comprises a pump 55, which is arranged in a collecting container 67. From the collecting container 67, the melted hot-melt adhesive 31 is fed by means of the pump 55 through the hose 57 to the slot die 59 and can be applied to surfaces by the slot die 59.

Figure 8:
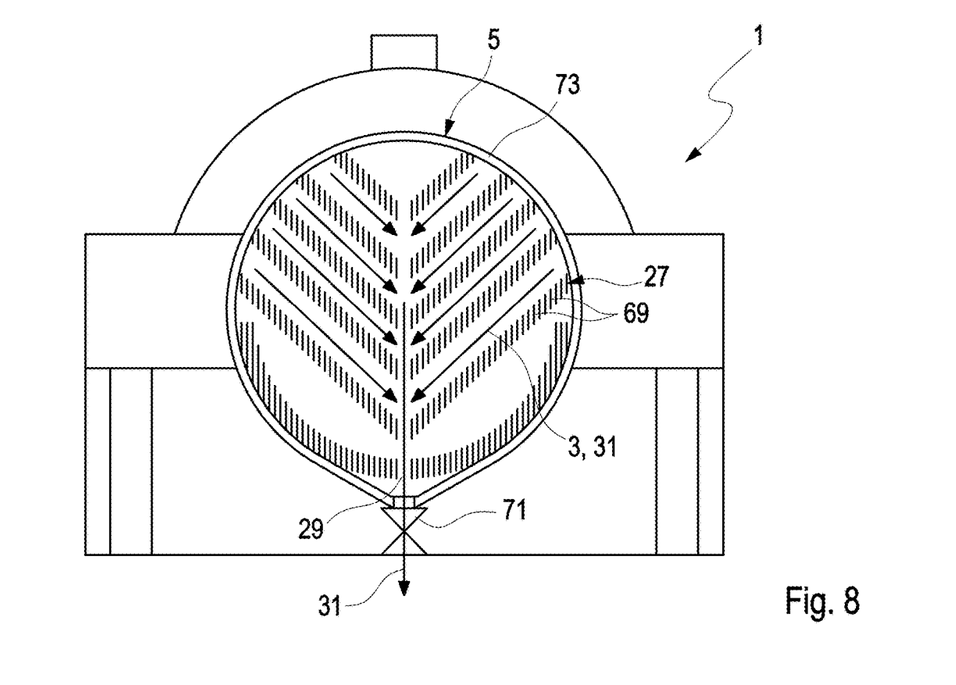
FIG. 8 shows a heating plate of a device for melting according to the invention.

FIG. 8 shows a heating plate 5, which has a V-shaped surface structure 27. The V-shaped surface structure 27 is formed by ribs 69. The melted hot-melt adhesive 31 flows along the V-shaped surface structure 27 to an outlet 29 and leaves the heating plate 5 through a valve 71. Valve 71 regulates the inflow of the hot-melt composition into the application unit or the reservoir (not shown). The heating plate 5 further has a seal 73 as the outer edge.

Example

200 L of a hot-melt adhesive of the trademark Kleiberit® HotCoatings 717.6 (a PUR hot-melt adhesive which reacts with moisture from the material to be bonded or from the environment, such as, for example, the air, that is to say there is not only a physical effect due to solidification of the liquid adhesive but additionally a chemically reactive effect) are placed in a cylindrical storage container. In the storage container, the hot-melt adhesive is additionally arranged in an aluminum composite bag.

The storage container is brought into a horizontal position and opened by removal of two opposite side walls of the storage container. The hot-melt adhesive remains in a rigid lateral wall of the storage container and the aluminum composite bag is opened where a side wall has been removed, so that the hot-melt adhesive at a side face of the storage container is exposed.

The storage container, likewise in a horizontal position, is then arranged in a device according to the invention. The device according to the invention has a heating plate and a plunger, between which the storage container is so arranged that the exposed hot-melt adhesive faces the heating plate.

The heating plate has a plate temperature of 150° C., the plunger generates a pressing pressure of 6 bar, and approximately 90 kg of hot-melt adhesive are melted per hour.

The melted hot-melt composition flows via a heated system of grooves into an application unit on which the device for melting is arranged. The application unit has three rollers.

The hot-melt composition collects between the heated metering roller of metal and the silicone-coated application roller and is then transferred from the co-rotating application roller to the substrate. The counter-rotating heated smoothing roller arranged immediately downstream smooths the surface of the applied hot-melt composition, which serves as a coating for flooring elements.

LIST OF REFERENCE NUMERALS 1 device
3 hot-melt adhesive
5 heating plate
7 plunger
9 plunger end face
11 mounting
13 storage container
15 rigid lateral wall
17 second of the two opposite side faces
19 first of the two opposite side faces
21 inner volume
23 horizontal plane
25 angle α
27 surface structure
29 outlet
31 melted hot-melt adhesive
32 hot-melt adhesive in unmelted form
33 flexible sleeve
35 side of the flexible sleeve 33
37 opening
41 coating device
43 application unit
45 longitudinal axis
47 angle β
49, 51 opposite side walls
53 further plunger
55 pump
57 hose
59 slot die
61 first application unit
63 second application unit
65 rollers
67 collecting container
69 ribs
71 valve
73 seal
75 pipe socket

The invention claimed is:

1. A device for melting a hot-melt adhesive, comprising:
a heating plate, and
a plunger comprising a plunger end face, a mounting and
a storage container having an inner volume of more than 50 L,
wherein
the storage container has a rigid lateral wall and two opposite side faces and contains the hot-melt adhesive,
the plunger end face and the heating plate are arranged opposite one another,
the storage container is received in the mounting in such a manner that the hot-melt adhesive is arranged between the plunger and the heating plate,
the storage container can be removed from the device,
the heating plate has a V-shaped surface structure which is formed by ribs,
the V-shaped surface structure forms an outlet for melted hot-melt adhesive, and
a flexible sleeve is arranged in the storage container, wherein the flexible sleeve has an opening at least on one side of the flexible sleeve.

2. The device as claimed claim 1, wherein the plunger end face and the heating plate enclose an angle α of more than 30° with a horizontal plane.

3. The device as claimed in claim 1, wherein the storage container has a cylindrical shape.

4. The device as claimed in claim 1, wherein the rigid lateral wall of the storage container is made of steel, plastics material or wood fibers.

5. A coating device comprising an application unit and a device for melting as claimed in claim 1, wherein the device for melting is arranged on the application unit.

6. A method for melting a hot-melt adhesive, comprising the following steps:
a) providing the hot-melt adhesive in a storage container having an inner volume of more than 50 L, wherein the storage container has a rigid lateral wall and two opposite side faces;
b) arranging the storage container, containing the hot-melt adhesive in unmelted form, in a device for melting which comprises
a heating plate, and
a plunger comprising a plunger end face, a mounting and the storage container wherein
the plunger end face and the heating plate are arranged opposite one another,
the storage container is received in the mounting in such a manner that the hot-melt adhesive is arranged between the plunger and the heating plate,
the storage container can be removed from the device,
the heating plate has a V-shaped surface structure which is formed by ribs, and
the V-shaped surface structure forms an outlet for melted hot-melt adhesive, wherein a first of the two opposite side faces of the storage container is arranged at the heating plate; and
c) feeding the hot-melt adhesive relative to the storage container and in the direction towards the heating plate, wherein
the two opposite side faces of the storage container are open, so that the hot-melt adhesive is brought into contact with the heating plate and there is formed melted hot-melt adhesive, which flows away on the heating plate, and
wherein the hot-melt adhesive is pressed against the heating plate with a pressing pressure by means of the plunger, and the pressing pressure is preferably more than 7 bar.

7. The method as claimed in claim 6, wherein
the storage container has a longitudinal axis which intersects the two opposite side faces of the storage container, and in step b), the storage container is so arranged in the device for melting that the longitudinal axis of the storage container encloses an angle β of less than 80° with a horizontal plane, wherein the angle β is preferably from 0° to 45°.

8. The method as claimed in claim 6, wherein the storage container comprises two opposite side walls which are removed at the latest before step c), so that the two opposite side faces of the storage container are open.

9. The method as claimed in claim 6, wherein the hot-melt adhesive is arranged in the storage container in a flexible sleeve, and the flexible sleeve is opened before step b) at least at the first of the two opposite side faces, which in step b) is arranged at the heating plate, wherein during the opening a portion of the flexible sleeve is folded back against the rigid lateral wall.

10. The method as claimed in claim 6, wherein in step b), the rigid lateral wall of the storage container is arranged tightly against the heating plate at the first of the two opposite side faces of the storage container.

11. The method as claimed in claim 10, wherein the device has at least one further plunger which presses the rigid lateral wall of the storage container against the heating plate for tight arrangement.

12. The method as claimed in claim 6, wherein in step c), the hot-melt adhesive is warmed at the heating plate to an adhesive temperature of more than 70° C.

13. The method as claimed in claim 6, wherein in step c), more than 50 kg of the hot-melt adhesive are melted per hour.

14. The method as claimed in claim 6, wherein the device for melting is arranged on an application unit, and the melted hot-melt adhesive flows into the application unit by means of gravity and by the pressing pressure, or the device for melting has a pump, and the melted hot-melt adhesive is fed to an application unit by means of the pump, wherein the application unit comprises a hose and a slot die.

15. The device as claimed in claim 1, wherein the flexible sleeve has a sleeve material comprising aluminum.

* * * * *